United States Patent
Ahn et al.

(10) Patent No.: US 11,515,096 B2
(45) Date of Patent: Nov. 29, 2022

(54) ELECTRONIC COMPONENT

(71) Applicant: SAMSUNG ELECTRO-MECHANICS CO., LTD., Suwon-si (KR)

(72) Inventors: Seung Min Ahn, Suwon-si (KR); Beom Joon Cho, Suwon-si (KR); Ki Young Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/239,158

(22) Filed: Apr. 23, 2021

(65) Prior Publication Data

US 2022/0084751 A1 Mar. 17, 2022

(30) Foreign Application Priority Data

Sep. 11, 2020 (KR) .................. 10-2020-0117053

(51) Int. Cl.
*H01G 4/30* (2006.01)
*H01G 4/224* (2006.01)
*H01G 4/012* (2006.01)
*H01G 4/248* (2006.01)

(52) U.S. Cl.
CPC .............. *H01G 4/30* (2013.01); *H01G 4/012* (2013.01); *H01G 4/224* (2013.01); *H01G 4/248* (2013.01)

(58) Field of Classification Search
None
See application file for complete search history.

(56) References Cited

U.S. PATENT DOCUMENTS

| 9,928,957 | B2 * | 3/2018 | Park ....................... H01G 4/12 |
| 11,289,270 | B2 * | 3/2022 | Jun ....................... H01G 4/012 |
| 2015/0114697 | A1 * | 4/2015 | Murrell ............ H01L 23/49565 174/255 |
| 2017/0040112 | A1 * | 2/2017 | Tanaka .................. H01G 4/232 |
| 2017/0164479 | A1 * | 6/2017 | Park ....................... H01G 4/248 |
| 2018/0166215 | A1 * | 6/2018 | Hamanaka ............. H01G 4/30 |
| 2018/0240596 | A1 * | 8/2018 | Son ........................ H01G 4/30 |
| 2019/0069411 | A1 * | 2/2019 | Park ...................... H05K 1/111 |
| 2019/0122823 | A1 * | 4/2019 | Cho ........................ H01G 2/06 |
| 2019/0124771 | A1 * | 4/2019 | Park ...................... H01G 4/224 |
| 2019/0164695 | A1 * | 5/2019 | Cho ........................ H01G 4/005 |
| 2020/0118743 | A1 * | 4/2020 | Byun ...................... H01G 4/12 |
| 2022/0084751 | A1 * | 3/2022 | Ahn ....................... H01G 4/30 |
| 2022/0130614 | A1 * | 4/2022 | Song ..................... H01G 2/065 |

FOREIGN PATENT DOCUMENTS

| KR | 10-2009-0039261 A | 4/2009 |
| KR | 10-1901704 B1 | 9/2018 |
| KR | 10-2019-0060312 A | 6/2019 |
| KR | 10-2019-0121203 A | 10/2019 |

* cited by examiner

Primary Examiner — Dion R. Ferguson
(74) Attorney, Agent, or Firm — Morgan, Lewis & Bockius LLP

(57) ABSTRACT

An electronic component includes a capacitor component including a body and an external electrode disposed outside the body; a metal frame connected to the external electrode; and an encapsulant at least partially covering regions of the capacitor component and the metal frame. The metal frame may include a surface unevenness portion disposed on at least a portion of an interface with the encapsulant.

21 Claims, 11 Drawing Sheets

(a)

(b)

A

ELECTRONIC COMPONENT

CROSS-REFERENCE TO RELATED APPLICATION

This application claims the benefit of Korean Patent Application No. 10-2020-0117053 filed on Sep. 11, 2020, with the Korean Intellectual Property Office, the disclosure of which is incorporated herein by reference.

BACKGROUND

The present disclosure relates to an electronic component.

A multilayer electronic component is used in various electronic devices due to miniaturizability thereof and high capacity. In recent years, due to the rapid rise of eco-friendly vehicles and electric vehicles, power driving systems in automobiles are increasing, and thus, demand for multilayer electronic components such as multilayer capacitors required for automobiles is increasing.

In order to be used as a component for automobiles, since characteristics resistant to high levels of heat or electrical reliability is required, the required performance of multilayer electronic components is also gradually increasing. Thus, there is increasing demand for multilayer electronic components for implementing high capacity in a limited space or which have excellent durability against vibrations and deformation.

In addition, in the conventional multilayer capacitor, since a ceramic body and a substrate may be directly in contact with the substrate through solder bumps, when the substrate is mounted, it may be difficult to secure a high level of reliability because heat or mechanical deformation generated in the substrate may be directly transmitted to the capacitor.

Accordingly, recently, a method has been proposed in which a metal frame is bonded to a side surface of the multilayer capacitor to secure a gap between the multilayer capacitor and the mounting substrate, so that stress from the substrate is not directly transmitted to the multilayer capacitor.

SUMMARY

An aspect of the present disclosure is to provide an electronic component having improved bonding strength between a metal frame and an insulating resin.

According to an electronic component according to an embodiment of the present disclosure, an electronic component includes: a capacitor component including a body and an external electrode disposed outside the body; a metal frame connected to the external electrode; and an encapsulant at least partially covering regions of the capacitor component and the metal frame. The metal frame may include a surface unevenness portion disposed on at least a portion of an interface with the encapsulant.

According to an electronic component according to an embodiment of the present disclosure, an electronic component includes: a capacitor component including a body and an external electrode disposed on the body; an encapsulant encapsulating at least a portion of the capacitor component; and a metal frame including a first portion embedded in the encapsulant and connected to the external electrode, and a second portion extending from the first portion and disposed outside the encapsulant. A degree of surface roughness of a portion of the first portion in contact with the encapsulant may be greater than a degree of surface roughness of a portion of the second portion spaced apart from the encapsulant.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
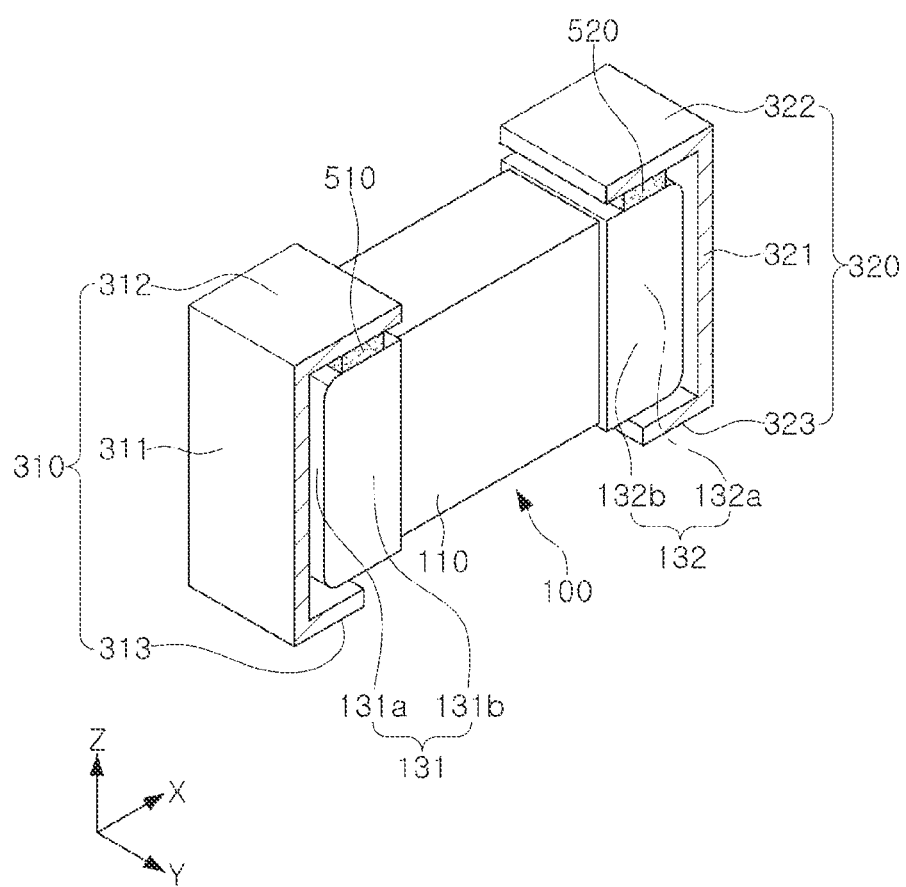
FIG. 1 is a view schematically illustrating a perspective view of an electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be through and complete, and will fully convey the scope of the disclosure to those skilled in the art. Accordingly, shapes and sizes of elements in the drawings may be exaggerated for clarity of description, and elements indicated by the same reference numeral are same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, an X direction may be defined as a first direction, an L direction or a length direction, a Y direction may be defined as a second direction, a W direction or a width direction, and a Z direction may be defined as a third direction, a stacking direction, a T direction, or a thickness direction.

Figure 2:
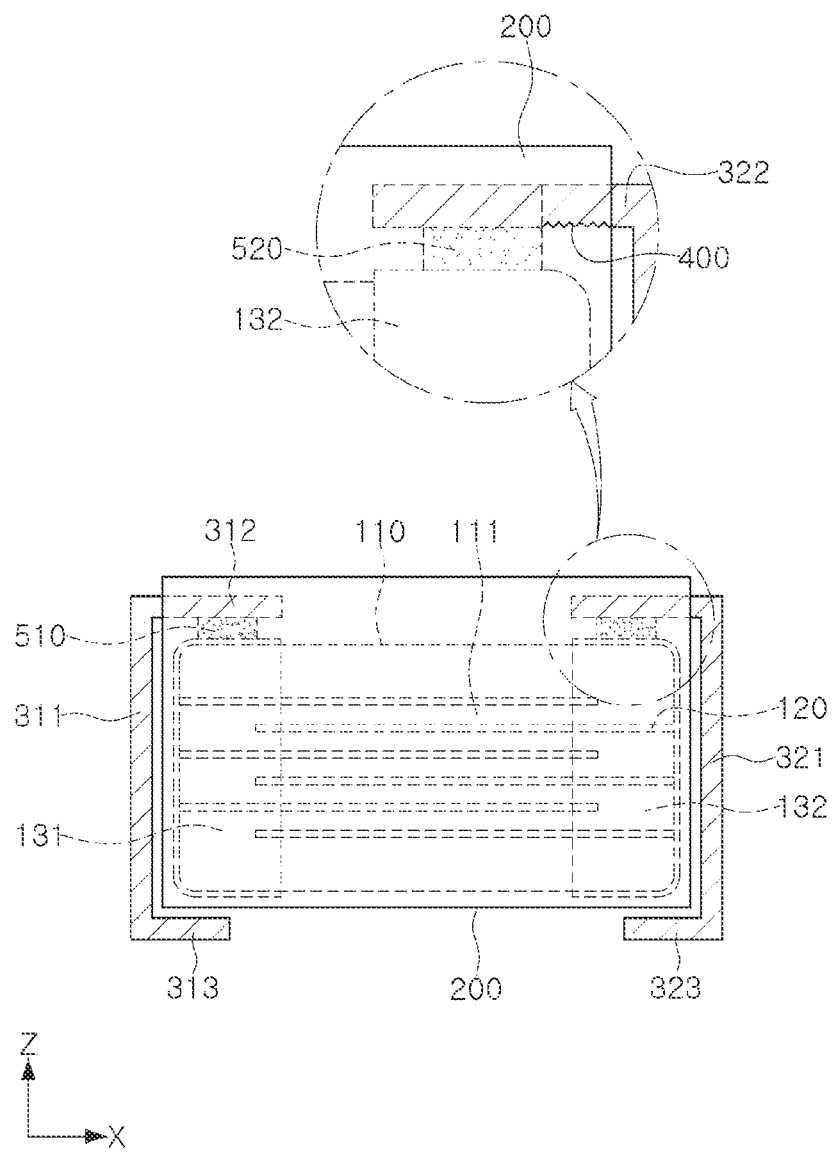
FIG. 2 is a front view and a partially enlarged view of FIG. 1.

FIG. 1 is a view schematically illustrating a perspective view of an electronic component according to an embodiment of the present disclosure, and FIG. 2 is a front view and a partially enlarged view of FIG. 1.

Referring to FIGS. 1 and 2, an electronic component 100 according to an embodiment of the present embodiment includes a capacitor component including a body 110 and external electrodes 131 and 132, and metal frames 310 and 320.

The body 110 is disposed between the metal frames 310 and 320 and is formed by alternately stacking a plurality of dielectric layers 111 and internal electrodes 120 as illustrated in FIG. 2.

Although the shape of the body 110 is not particularly limited, for example, as illustrated in FIG. 1, it may be formed in a hexahedral shape or a similar shape. In addition, due to the shrinkage of the ceramic powder included in the body 110 during a sintering process, the body 110 may have a substantially hexahedral shape rather than a complete rectangular parallelepiped shape.

A plurality of dielectric layers 111 forming the body 110 are in a sintered state, and a boundary between the adjacent dielectric layers 111 may be integrated so that it is difficult to confirm without using a scanning electron microscope (SEM).

A raw material for forming the dielectric layer 111 is not particularly limited as long as sufficient electrostatic capacity can be obtained. For example, the dielectric layer 111 may be formed of a barium titanate-based material, a lead composite perovskite-based material, a strontium titanate-based material, or the like. In addition, the material for forming the dielectric layer 111 may be a material in which ceramic powder such as barium titanate ($BaTiO_3$) in which various ceramic additives, organic solvents, plasticizers, binders, dispersants, and the like, according to an object of the present disclosure, are added.

The internal electrodes 120 are alternately stacked with the dielectric layers 111. That is, the plurality internal electrodes 120 are alternately disposed so as to face each other with the dielectric layer 111 constituting the body 110 interposed therebetween, as illustrated in FIG. 2, and each of the internal electrodes 120 can be exposed to one of both ends of the body 110.

In this case, each of the internal electrodes 120 may be electrically separated from each other by a dielectric layer 111 disposed in the middle. The body 110 may be formed by alternately stacking ceramic green sheets on which internal electrodes 120 having different polarities are printed, and then sintering them.

A material forming the internal electrodes 120 is not particularly limited, and for example, it may be formed using a noble metal material such as palladium (Pd), a palladium-silver (Pd—Ag) alloy, and a conductive paste made of one or materials of nickel (Ni) and copper (Cu).

A printing method of the conductive paste may be a screen-printing method or a gravure printing method, and the present disclosure is not limited thereto.

External electrodes 131 and 132 are disposed outside the body 110, and may include a first external electrode 131 and a second external electrode 132. In this case, the external electrodes 131 and 132 may be connected to each of the alternately stacked plurality of internal electrodes 120. For example, voltages having different polarities may be provided to the first external electrode 131 and the second external electrode 132, and may be electrically connected to the internal electrodes 120 having different polarities, respectively.

The external electrodes 131 and 132 may be formed using various materials having electrical conductivity, such as metal, and a specific material may be determined in consideration of electrical characteristics or structural stability, and further, may have a multilayer structure.

For example, the external electrodes 131 and 132 may include an electrode layer disposed on the body 110 and a plating layer formed on the electrode layer. More specifically, the electrode layer may be a sintered electrode including a conductive metal and glass, and the conductive metal may be Cu. In addition, the electrode layer may be a resin-based electrode including a plurality of metal particles and a conductive resin.

For a more specific example of the plating layer, the plating layer may be a Ni plating layer or a Sn plating layer, and may have a form in which a Ni plating layer and an Sn plating layer are sequentially formed on the electrode layer, and may also include a plurality of Ni plating layers and/or a plurality of Sn plating layers.

The external electrodes 131 and 132 may include head portions 131a and 132a formed on both side surfaces of the body 110 in a first direction, respectively, and band portions 131b and 132b extending from the head portions 131a and 132a onto portions of the other surfaces of the body 110, respectively.

The head portions 131a and 132a of the external electrodes 131 and 132 may be disposed to be spaced apart from the side surface frames 311 and 321 of the metal frames 310 and 320, respectively. In addition, the band portions 131b and 132b of the external electrodes 131 and 132 may be disposed to be spaced apart from the upper surface frames 312 and 322 and the lower surface frames 313 and 323 of the metal frames 310 and 320, respectively.

In this case, conductive adhesive layers 510 and 520 may be further provided in at least a portion of the space in which the external electrodes 131 and 132 and the metal frames 310 and 320 are spaced apart from each other. That is, the conductive adhesive layers 510 and 520 may structurally and electrically connect the external electrodes 131 and 132 and the metal frames 310 and 320 to each other.

The metal frames 310 and 320 are connected to the external electrodes 131 and 132, and include side surface frames 311 and 321 extending in a third direction, and upper surface frames 312 and 322, and lower surface frames 313 and 323 extending in a first direction, respectively.

The side surface frames 311 and 321 are disposed to face both side surfaces of the capacitor component, respectively, and the upper surface frames 312 and 322 extend from an upper end of the side surface frames 311 and 321 to face the upper surface of the capacitor component, respectively, and the lower surface frames 313 and 323 extend from a lower end of the side surface frames 311 and 321 to face the lower surface of the capacitor component, respectively.

In this case, a connection angle between the side surface frames 311 and 321 and the upper surface frames 312 and 322 may be formed to be 90°, or formed to be narrower than 90° if necessary, and accordingly, the lower surface frames 313 and 323 may be disposed below the external electrodes 131 and 132.

In FIG. 1, the illustration is omitted to describe an overall shape of the electronic component 100, but as illustrated in FIG. 2, the electronic component 100 according to an embodiment of the present disclosure further includes an encapsulant 200. The encapsulant 200 may be formed of an insulator such as an insulating resin, and may be formed to surround the electronic component 100. That is, it may be configured to mold the exterior of the electronic component 100.

More specifically, the encapsulant 200 may at least partially cover regions of the capacitor components and the metal frames 310 and 320. Accordingly, the encapsulant 200 protects the product from external shock or moisture while maintaining a bonding state of the body 110 and the external electrodes 131 and 132 and the metal frames 310 and 320 so that reliability of the electronic component 100 can be improved.

In this case, the side surface frames 311 and 321 and the lower surface frames 313 and 323 are exposed externally, so that a gap between a lower portion of the encapsulant 200 and the lower surface frames 313 and 323 may be maintained. Accordingly, when deformation of the metal frames 310 and 320 occurs due to external force, the deformation can be freely maintained.

Referring to FIGS. 1 and 2, the electronic component 100 according to an embodiment of the present disclosure may further include conductive adhesive layers 510 and 520. In this case, positions in which the conductive adhesive layers 510 and 520 are provided may be various, and the positions illustrated in FIGS. 1 and 2 are merely examples.

For example, the conductive adhesive layers 510 and 520 may be provided between upper surfaces of the band portions 131b and 132b of the external electrodes 131 and 132 and upper surface frames 312 and 322 of the metal frames 310 and 320, respectively. In this case, in a portion where the conductive adhesive layers 510 and 520 are not provided, the external electrodes 131 and 132 and the metal frames 310 and 320 are spaced apart from each other. Since there is a portion spaced apart from each other as described above, when the electronic component 100 is mounted on a substrate, it is possible to prevent deformation stress, or the like, of the substrate, being directly transmitted to the body 110.

In addition, the conductive adhesive layers 510 and 520 are provided on an upper portion, which is a position, relatively far from a mounting surface of the electronic component 100, such that lower portions of the metal frames 310 and 320 may serve as a spring absorbing shocks. That is, the metal frames 310 and 320 can more effectively absorb external stress due to deformation of the substrate.

Referring to the partially enlarged view of FIG. 2, the metal frames 310 and 320 according to an embodiment of the present disclosure include a surface unevenness portion 400 formed on at least a portion of an interface with the encapsulant 200.

The surface unevenness portion 400 means that a plurality of protruding portions and recessed portions are repeated on the surfaces of the metal frames 310 and 320. Therefore, a portion in which the surface unevenness portion 400 is formed, is characterized in that surface roughness is higher than that of the portion in which the surface unevenness portion 400 is not formed. Here, a pattern of the unevennesses of the surface unevenness portion 400 may be regular, or irregular. The portion in which the surface unevenness portion 400 is not formed may include, for example, the upper surfaces of the upper surface frames 312 and 322 in FIG. 2, a portion of the side surface frames 311 and 321, and/or a portion of the lower surface frames 313 and 323.

A method of forming the surface unevenness portion 400 on the metal frames 310 and 320 may be various, and for example, a method such as press processing, etching, photolithography, knurling processing, and the like may be used to form a surface unevenness portion 400.

As the surface unevenness portion 400 is formed as described above, an interfacial area between the metal frames 310 and 320 and the encapsulant 200 may be increased. In addition, a slope of the interface may not be constant and may be repeatedly changed. Accordingly, interfacial bonding force between the metal frames 310 and 320 and the encapsulant 200 may be improved, and a passage through which moisture penetrates may be extended, so that moisture resistance may be improved.

Specifically, according to the embodiment of the present disclosure illustrated in FIG. 2, a surface unevenness portion 400 may be formed on at least a region of the lower surfaces of the upper surface frames 312 and 322. That is, the surface unevenness portion 400 may be formed on the upper surface frames 312 and 322 having an interface in contact with the encapsulant 200 among the metal frames 310 and 320, and in particular, thereamong, the surface unevenness portion 400 may be formed on the lower surfaces of the upper surface frames 312 and 322.

Here, the lower surfaces of the upper surface frames 312 and 322, the body 110, and the external electrodes 131 and 132 are spaced apart from each other to face each other, and there is a high possibility that external heat or moisture penetrates into the spaced area. Therefore, a surface unevenness portion 400 may be formed on the lower surfaces of the upper surface frames 312 and 322 to improve interfacial bonding force, thereby increasing heat dissipation and moisture proofing effects of the electronic component 100.

In addition, the surface unevenness portion 400 may be formed adjacent to the conductive adhesive layers 510 and 520. In this case, the encapsulant 200 may be more strongly bonded to a structure connected to the external electrodes 131 and 132, the conductive adhesive layers 510 and 520, and the metal frames 310 and 320, thereby improving the stability of the structure. Then, even if external force acts on the electronic component 100, durability thereof can be maintained.

Figure 3:
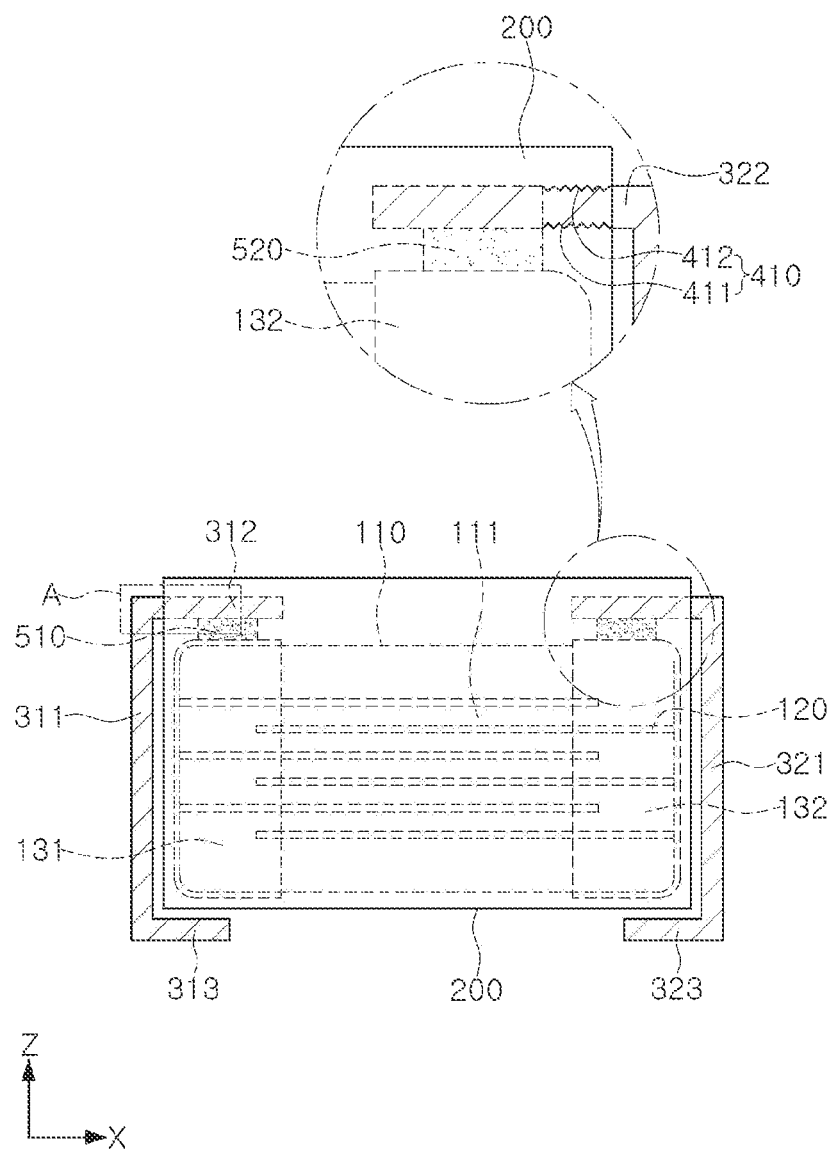
FIG. 3 is a front view and a partially enlarged view of an electronic component according to another embodiment of the present disclosure.
Figure 4:
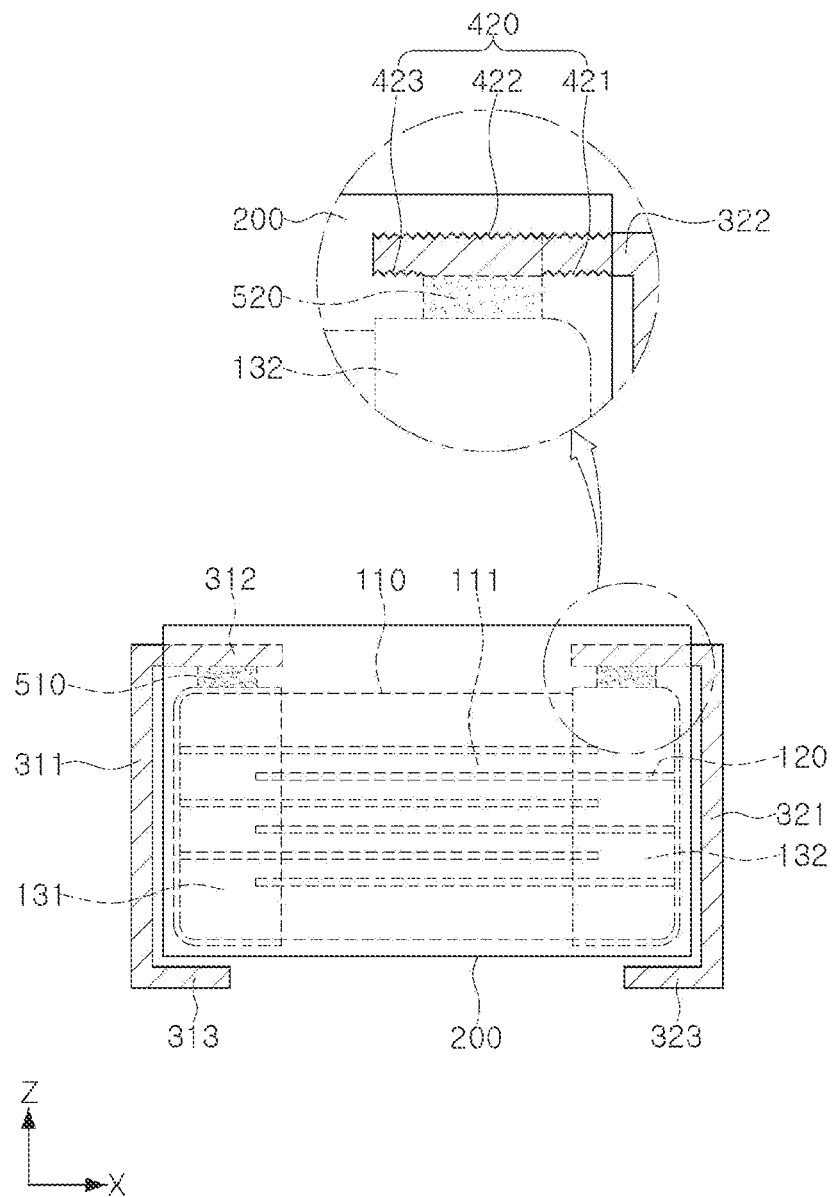
FIG. 4 is a front view and a partially enlarged view of an electronic component according to another embodiment of the present disclosure.

FIG. 3 is a front view and a partially enlarged view of an electronic component according to another embodiment of the present disclosure, and FIG. 4 is a front view and a partially enlarged view of an electronic component according to another embodiment of the present disclosure.

According to other embodiments of the present disclosure illustrated in FIGS. 3 and 4, a surface unevenness portion 400 may be further formed on at least a region of the upper surfaces of the upper surface frames 312 and 322.

That is, the surface unevenness portion 400 may be formed simultaneously on the upper and lower surfaces of the upper surface frames 312 and 322 among the metal frames 310 and 320.

First, referring to FIG. 3, a surface unevenness portion 410 may be formed on the upper surface frames 312 and 322 in a region between the conductive adhesive layers 510 and 520 and the side surface frames 311 and 321. Here, the surface unevenness portion 410 may include a first surface unevenness portion 411 formed on the lower surfaces of the upper surface frames 312 and 322 and a second surface unevenness portion 412 formed on the upper surfaces.

Referring to FIG. 4, a surface unevenness portion 420 may be formed on the upper and lower surfaces of the upper frames 312 and 322. Here, the surface unevenness portion 420 may include a 1-1 surface unevenness portion 421 formed on the exterior of the lower surfaces of the upper surface frames 312 and 322, and a 2-1 surface unevenness portion 422 formed on the upper surface, and a 3-1 surface unevenness portion 423 formed on the inner side of the lower surface.

In this manner, by forming the surface unevenness portions 411, 412, 421, 422, and 423 on the upper and lower surfaces of the upper surface frames 312 and 322, bonding force between the metal frames 310 and 320 and the encapsulant 200 may be strengthened. In addition, it is possible to more effectively protect against heat or moisture penetrating in various directions with respect to the interface between the metal frames 310 and 320 and the encapsulant 200.

Figure 5:
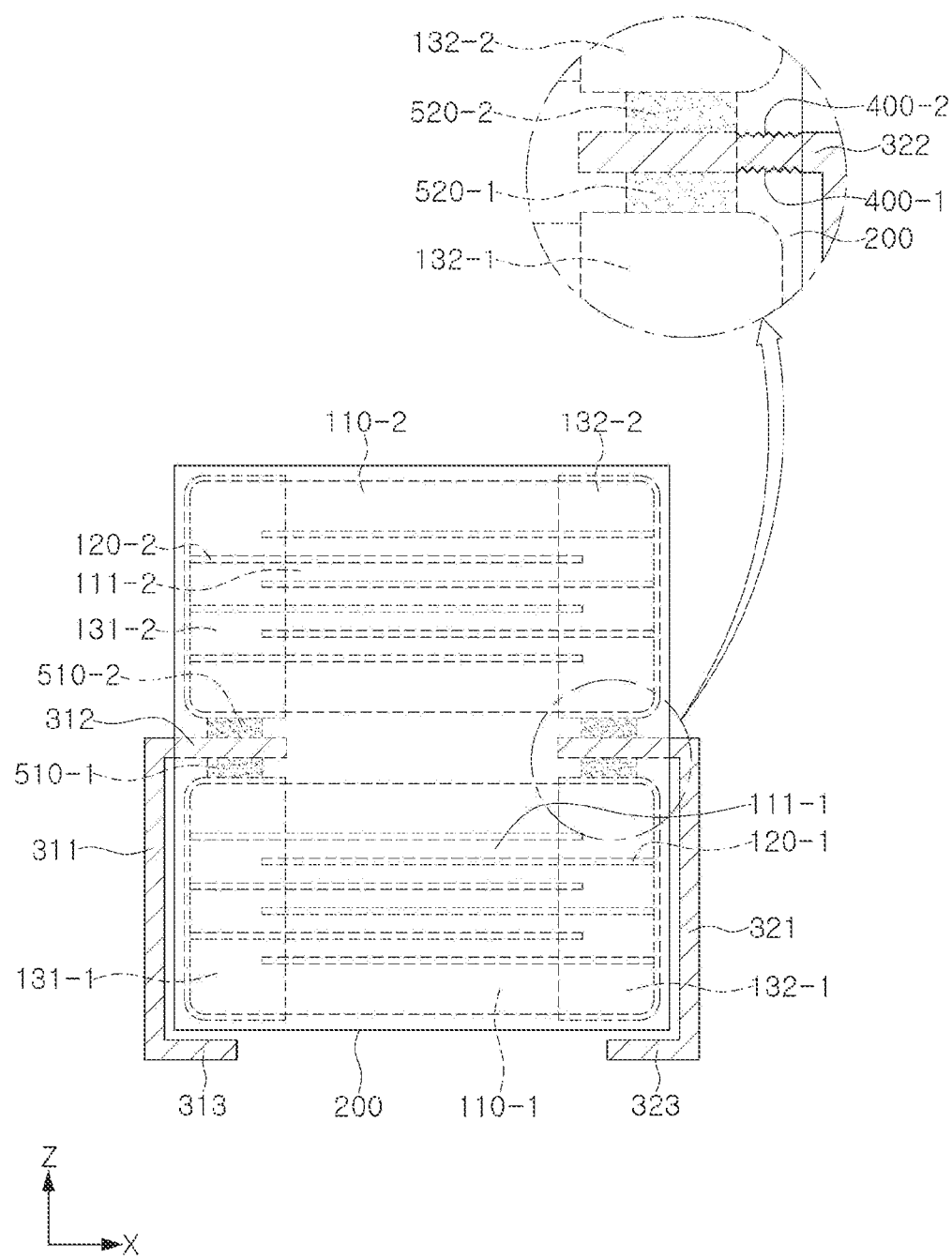
FIG. 5 is a front view and a partially enlarged view of an electronic component according to a modified example of the embodiment illustrated in FIG. 3.

FIG. 5 is a front view and a partially enlarged view of an electronic component according to a modified example of the embodiment illustrated in FIG. 3.

More specifically, an embodiment in which a plurality of capacitor components are stacked is illustrated in FIG. 5, and in the present embodiment, a capacity of the electronic component may be increased. Meanwhile, even in an embodiment in which a plurality of capacitor components are stacked, it is natural that a surface unevenness portion may be formed at the interface between the metal frames and the encapsulant.

According to the embodiment illustrated in FIG. 5, the electronic component 100 may include a plurality of capacitor components, and each capacitor component includes a body and an external electrode. In this case, one of the plurality of capacitor components is disposed below the upper surface frames 312 and 322. The remaining capacitor components may be stacked and disposed above the upper surface frames 312 and 322.

Although the number of capacitor components stacked above the upper surface frames 312 and 322 may vary, it is preferable that the electronic components 100 are stacked to an extent that the electronic components 100 can be stably mounted on a substrate. For example, the electronic component 100 may include two capacitor components as illustrated in FIG. 5. Hereinafter, in the present specification, an electronic component 100 including two capacitor components will be exemplarily described.

Referring to FIG. 5, one of the capacitor components included in the electronic component 100 is disposed below the upper surface frames 312 and 322, and may include a body 110-1 and first and second external electrodes 131-1 and 132-1. The other capacitor component is disposed above the upper surface frames 312 and 322, and includes a body 110-2 and first and second external electrodes 131-2 and 132-2.

In addition, the encapsulant 200 may partially cover regions of both capacitor components and the metal frames 310 and 320. For example, as illustrated in FIG. 5, the encapsulant 200 may collectively cover some regions of bodies 110-1 and 110-2 of both capacitor components, external electrodes 131-1, 132-1, 131-2, and 132-2, and upper surface frames 312 and 322.

In this case, a conductive adhesive layer may be provided between the external electrodes of the plurality of capacitor components and the upper surface frames 312 and 322, respectively. For example, conductive adhesives 510-1 and 520-1 may be provided between the external electrodes 131-1 and 132-1 of the capacitor component disposed below the upper surface frames 312 and 322 and the upper surface frames 312 and 322. Conductive adhesives 510-2 and 520-2 may also be provided between the external electrodes 131-2 and 132-2 of the capacitor component disposed above the upper surface frames 312 and 322 and the upper surface frames 312 and 322.

In the present embodiment, a surface unevenness portion 400 may be formed on upper surface frames 312 and 322 having an interface in contact with the encapsulant 200 among the metal frames 310 and 320.

As an example, as illustrated in FIG. 5, surface unevenness portions 400-1 and 400-2 may be formed on upper and lower surfaces of the upper surface frames 312 and 322.

Here, looking at the capacitor components disposed below the upper surface frames 312 and 322 first, the lower surfaces of the upper surface frames 312 and 322, the body 110-1, and the external electrodes 131-1 and 132-1 are spaced apart from each other and face each other, and there is a high possibility that external heat or moisture penetrates into the spaced area.

Therefore, the surface unevenness portion 400-1 may be formed on the lower surfaces of the upper surface frames 312 and 322 to improve the interfacial bonding strength with the encapsulant 200, thereby increasing a heat dissipation and moisture-proof effect of the electronic component 100.

Similarly thereto, looking at the capacitor components disposed above the upper surface frames 312 and 322, the upper surfaces of the upper surface frames 312 and 322, the body 110-2, and the external electrodes 131-2 and 132-2 are spaced apart from each other and face each other, and there is a high possibility that external heat or moisture penetrates into the spaced area.

Therefore, the surface unevenness portion 400-2 may also be formed on the upper surfaces of the upper surface frames 312 and 322 to improve the interfacial bonding strength with the encapsulant 200, thereby increasing a heat dissipation and moisture-proof effect of the electronic component 100.

Meanwhile, a structure in which a plurality of capacitor components are stacked as illustrated in FIG. 5 has a problem in that stability is deteriorated when mounted on a substrate, compared to a structure composed of only one capacitor component.

In this case, by providing the surface unevenness portions 400-1 and 400-2 on the surfaces of the metal frames 310 and 320 according to an embodiment of the present disclosure, it may also be helpful to the stability of the structure.

That is, when the bonding force between the encapsulant 200 and the metal frames 310 and 320 is strengthened by the surface unevenness portions 400-1 and 400-2, bonding force between the plurality of capacitor components may be strengthened accordingly.

Then, the durability of the electronic component 100 can be improved compared to the conventional stacked structure in which the surface unevenness portions 400-1 and 400-2 are not provided, and thus, stability in the mounting thereof on a substrate can also be improved.

For example, each of the surface unevenness portions 400-1 and 400-2 may be formed adjacent to the conductive adhesive layers 510-1, 520-1, 510-2, and 520-2.

In this case, the encapsulant 200 may be more strongly bonded to a coupling structure including upper surface frames 312 and 322, the respective conductive adhesive layers 510-1, 520-1, 510-2 and 520-2, and the respective external electrodes 131-1, 132-1, 131-2, and 132-2 so that the stability of the coupling structure may be further improved.

Then, even if an external force acts on the electronic component 100, its durability can be maintained.

Figure 6:
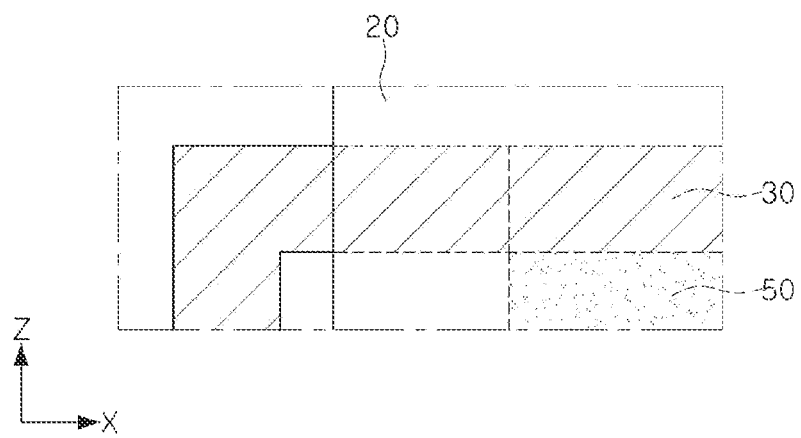
FIG. 6 is a partial enlarged view of region A of FIG. 3 compared to a conventional embodiment.
Figure 6:
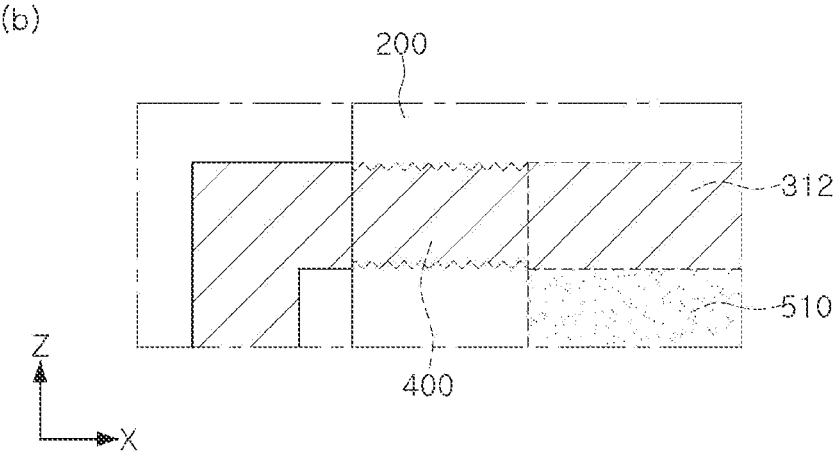

In order to describe the heat dissipation and moisture-proof effect in more detail, it will be described below with reference to FIG. 6. FIG. 6 shows a partially enlarged view of area A of FIG. 3 compared to a conventional embodiment.

Referring to the embodiment in which the conventional surface unevenness portion 400 is not formed in FIG. 6A, the encapsulant 20 and the metal frame 30 have a flat interface, so the boundary thereof also appears as a straight line in the front view.

In this case, moisture may penetrate into the interface between the metal frame 30 and the encapsulant 20 from the exterior of the electronic component, that is, from the upper portion or the left side portion of the metal frame 30 in FIG. 6A.

When moisture penetrates a region, adjacent to the conductive adhesive layer 50, the metal frame 30, the external electrode, and the conductive adhesive layer 50 may be separated from each other even with small external force.

Accordingly, the durability of the electronic component decreases, and the product defect occurrence rate thereof may increase.

For example, in a structure in which internal electrodes having different polarities are alternately stacked, each of the internal electrodes is alternately connected to external electrodes on both sides. In this case, a region in which an internal electrode and an external electrode are not connected to each other must be electrically insulated so that a function of the electronic component may be normally performed. In addition, moisture penetrating into the damaged portion may permeate to a region of an internal structure of an electronic component in which electrical insulation is to be maintained in some cases. Then, moisture acts as a passage for electricity in a region in an insulated state, and an unnecessary electrical current may cause to occur.

However, when moisture penetrates into the corresponding region, an electric current may occur between internal electrodes and external electrodes that should not be connected to each other, thereby causing a defect in electronic components.

In contrast thereto, when the surface unevenness portion 400 is formed on the upper and lower surfaces of the upper surface frame 312 according to an embodiment of the present disclosure, the interface between the encapsulant 200 and the upper surface frame 312 may not be flat. That is, as illustrated in (B) of FIG. 6, the boundary thereof also appears uneven in the front view. Then, an effect of increasing an interfacial area between the encapsulant 200 and the upper surface frame 312 is exerted, so that the bonding force of both configurations may be further strengthened.

In addition, moisture may penetrate into an interface between the upper surface frame 312 and the encapsulant 200 from the upper or left portion of the upper surface frame 312, and in this case, the interface is uneven and a passage of moisture is extended, it is possible to suppress transfer of moisture to the inside the electronic component 100. That is, it has an effect of improving the moisture resistance of the electronic component 100.

Figure 7:
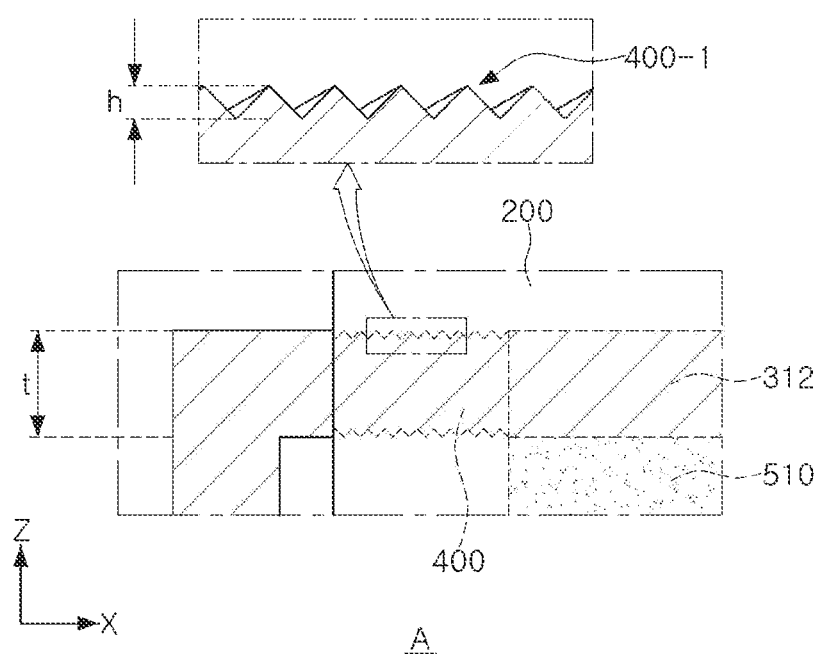
FIGS. 7 to 9 are partially enlarged views of different embodiments of the surface unevenness portion illustrated in FIG. 6.
Figure 8:
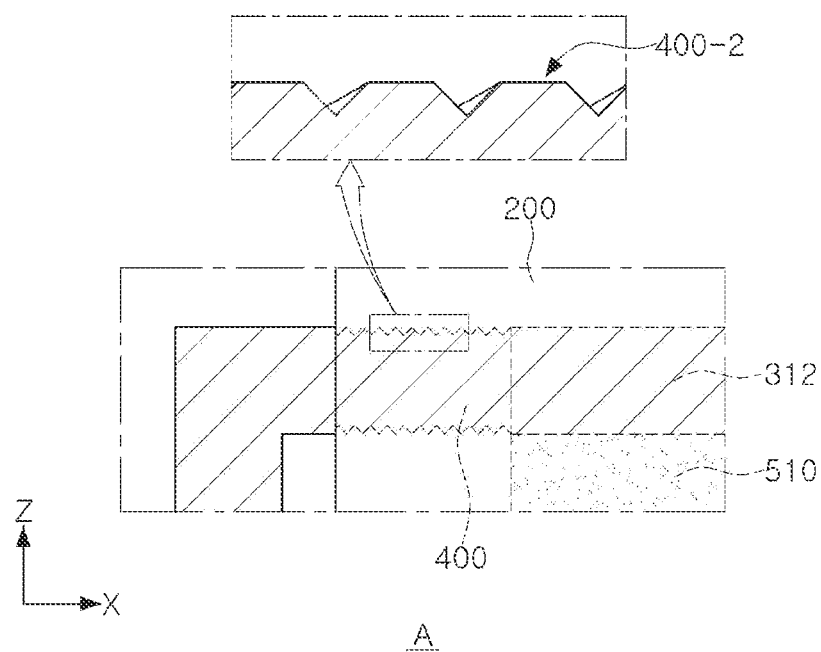
Figure 9:
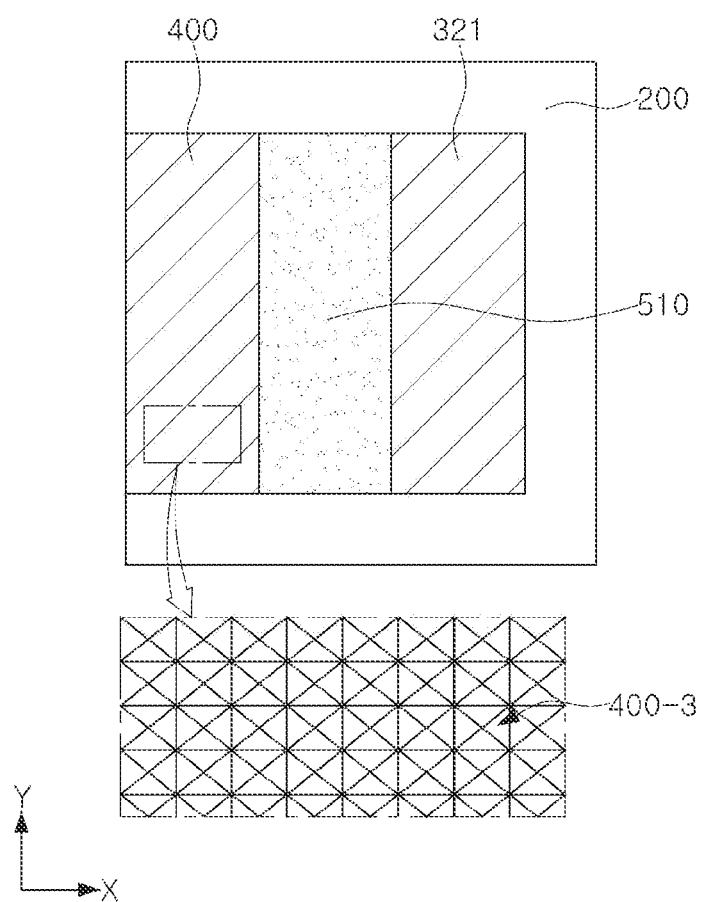

FIGS. 7 to 9 are partially enlarged views of different embodiments of the surface unevenness portion illustrated in FIG. 6, respectively, and FIG. 9 is a graph showing a conventional defect rate due to moisture absorption of an electronic component according to the embodiments of FIGS. 7 to 9 in contrast with the conventional embodiment.

First, FIGS. 7 and 8 correspond to various embodiments of the front view showing a partially enlarged view of region A of FIG. 3, similar to FIG. 6.

According to the embodiment illustrated in FIG. 7, a surface unevenness portion 400 may have repeated unevennesses 401 having a sawtooth shape. According to the embodiment illustrated in FIG. 8, the surface unevenness portion 400 may have at least one linear groove 402. Here, in order to implement the embodiments illustrated in FIGS. 7 and 8, the surface unevenness portion 400 may be formed by, for example, laser processing, etching, photolithography, or the like.

Next, FIG. 9 corresponds to an embodiment of a front view when viewed in a third direction (Z direction) of some structures including the encapsulant 200, the upper surface frame 312, and the conductive adhesive 510. According to the embodiment illustrated in FIG. 9, the surface unevenness portion 400 may be a portion in which a unit pyramidal shape 403 in which a central portion protrudes repeats. Here, in order to implement the embodiment illustrated in FIG. 9, the surface unevenness portion 400 may be formed by, for example, a knurling method.

Figure 10:
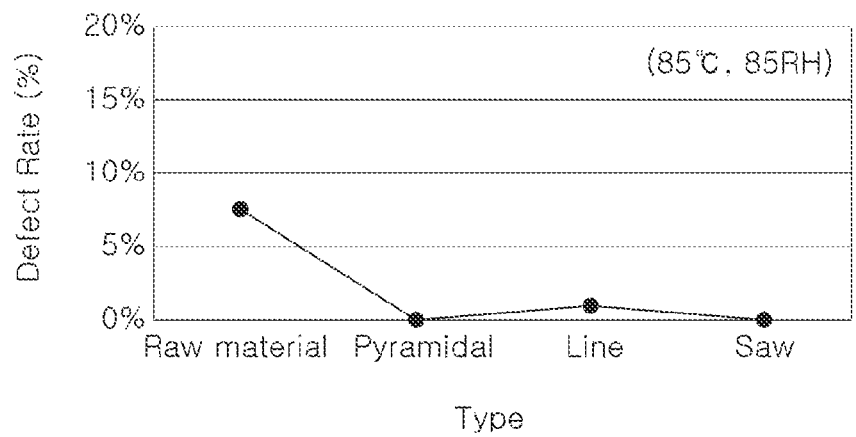
FIG. 10 is a graph illustrating a rate of defect occurrence due to moisture absorption of an electronic component according to the embodiment of FIGS. 7 to 9, compared to the conventional exemplary embodiment.

Meanwhile, referring to FIG. 10, it was confirmed that the defect rate was lowered compared to the embodiment without the conventional surface unevenness portion 400 according to the respective embodiments illustrated in FIGS. 7 to 9.

More specifically, the graph of FIG. 10 shows results of an experiment for evaluating the reliability of an electronic component performed by the inventor of the present disclosure.

Here, the reliability evaluation experiment performed by the inventor means a complex acceleration reliability experiment maintaining a constant temperature and humidity environment for 1000 hours, after a thermal cycling (TC) test, which repeats a fluctuation cycle of the low and high temperature environment 1000 times for a certain period of time.

A low temperature environment used in this TC test is −55° C., and a high temperature environment used therein is 125° C. In addition, the constant temperature and humidity environment were set to maintain a temperature of 85° C. and a humidity of 85% RH.

As illustrated in FIG. 10, in the case of a raw material in which the surface unevenness portion 400 is not formed as a result of the experiment, the rate of defect occurrence due to moisture absorption was about 8% (represented by "raw material" in FIG. 10). When the surface unevenness portion 400 is not formed, it can be understood that a lot of deformation of the interface occurs due to thermal expansion, and more moisture has penetrated into the interior of the electronic component. That is, it is interpreted that a short phenomenon of an internal electrode layer occurs more frequently due to moisture absorption, and thus the rate of defect occurrence is high.

In contrast thereto, in the case of each embodiment (Pyramidal, Line, Sawtooth) in which the surface unevenness portion 400 are formed, it can be seen that the defect incidence rate is 1% or less. This is because interfacial bonding force between the metal frames 310 and 320 and the encapsulant 200 is stronger when the surface unevenness portion 400 of various embodiments is formed, so that less moisture penetrates into the interior of the electronic component 100. That is, it is interpreted that an effect of lowering the rate of defect occurrence due to moisture absorption is exhibited by the formation of the surface unevenness portion 400.

Figure 11:
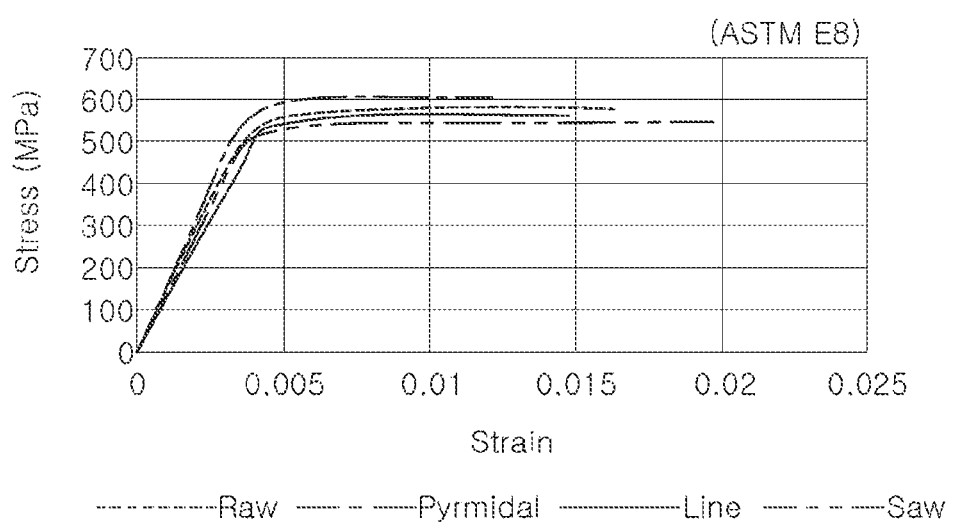
FIG. 11 is a graph illustrating results of a tensile test of the electronic component according to the embodiment of FIGS. 7 to 9 compared to the conventional embodiment.

FIG. 11 is a graph showing results of a tensile test of an electronic component according to the embodiments of FIGS. 7 to 9 compared to the conventional embodiment.

More specifically, the graph of FIG. 11 shows the results of a tensile test of a metal frame using a universal testing machine (UTM) by the inventor of the present disclosure. In this case, the tensile test was conducted according to a sheet standard of 'ASTM E8' widely known to those skilled in the art, and a 200N load cell was used. Referring to FIG. 11, when compared with the conventional embodiment (Raw) in which the surface unevenness portion 400 are not formed, it can be confirmed that tensile strength of the metal frames 310 and 320 is not significantly reduced, even in the case in which the surface unevenness portion 400 is formed according to various embodiments (Pyramidal, Line, Sawtooth) of the present disclosure. That is, even if a part of the surface of the metal frames 310 and 320 is cut off or corroded to form the surface unevenness portion 400, it means that the durability is not significantly reduced.

Accordingly, the electronic component 100 in which the surface unevenness portion 400 is formed according to the embodiment of the present disclosure has an advantage in that the moisture resistance reliability is improved and the loss of mechanical strength is small.

Figure 12:
FIG. 12 is a graph illustrating results of a tensile test according to the depth of the unevennesses of the surface unevenness portion illustrated in FIG. 7.

FIG. 12 is a graph showing results of a tensile test according to the depth of the unevennesses of the surface unevenness portion of FIG. 7. That is, the graph of FIG. 12 shows the results of measuring the tensile strength of the metal frames 310 and 320 according to the depth of unevennesses 401, when the surface unevenness portion 400 has the repeated unevennesses 401 of a sawtooth type.

Here, when the thickness of the metal frames 310 and 320 is defined as t, and the depth of the unevennesses 401 included in the surface unevenness portion 400 is defined as h, as h approaches a value of t, it can be seen that the tensile strength decreases. That is, as the depth h of the unevenneses 401 increases, the tensile strength of the metal frames 310 and 320 gradually decreases. The thickness t of the metal frames 310 may refer to, based on an optical microscope or scanning electron microscope (SEM) image for a cross sectional in a length-thickness (X-Z) direction in a central portion of the electronic component 100 in a width (Y) direction, an arithmetic means of thicknesses at different measurement points of the metal frame 310. The number of the measurement points of the metal frame 310 may be, for example, 5, 10, or other numbers recognizable by one of the ordinary skill in the art, and may have an equal interval between adjacent measurement points. The thickness t of the metal frames 320 may be obtained similarly. The depth h of the unevennesses 401 included in the surface unevenness portion 400 may refer to, based on the optical microscope or scanning electron microscope (SEM) image used to measure the thickness t, an arithmetic means of depths of unit structures constituting the unevennesses 401. The number of the unit structures selected in the measurement may be, for example, 5, 10, or other numbers recognizable by one of the ordinary skill in the art. Other methods and/or tools appreciated by one of ordinary skill in the art, even if not described in the present disclosure, may also be used.

In this case, even if the surface unevenness portion 400 is formed, since the present disclosure is to minimize the loss of durability, in the graph of FIG. 12, it is advantageous that the depth of the unevennesses 401 is limited in a section of 'h≤0.1*t' before a slope sharply changes. Therefore, preferably, the depth h of the unevennesses 401 included in the surface unevenness portion 400 may be 0.1*t or less.

Meanwhile, in FIG. 12, only an embodiment in which the surface unevenness portion 400 of a sawtooth type is formed is illustrated, but in the surface unevenness portion 400 according to another embodiment of the present disclosure, when the depth h of the unevenness is 0.1*t or less, the loss of durability may be minimized. Therefore, preferably, the maximum depth h of the unevennesses included in the surface unevenness portion 400 may be 0.1*t or less.

As set forth above, according to an embodiment of the present disclosure, bonding force between the metal frame and the insulating resin may be improved, so that durability of the electronic component against external force may be improved.

In addition, according to an embodiment of the present disclosure, moisture resistance reliability and a heat dissipation effect of the electronic component can be improved. In addition, it is possible to prevent interlayer short failures due to moisture absorption of the electronic component.

However, various and advantageous advantages and effects of the present disclosure are not limited to the above description, and will be more readily understood in the process of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. An electronic component, comprising:
   a capacitor component including a body and an external electrode disposed outside the body;
   a metal frame connected to the external electrode and including an upper surface frame facing an upper surface of the capacitor component; and
   an encapsulant at least partially covering regions of the capacitor component and the upper surface frame,
   wherein the metal frame comprises a surface unevenness portion disposed on at least a portion of an interface with the encapsulant.

2. The electronic component of claim 1, wherein the metal frame further comprises:
   a side surface frame disposed to face a side surface of the capacitor component in a first direction; and
   a lower surface frame extending from a lower end of the side surface frame to face a lower surface of the capacitor component,
   wherein the upper surface frame extends from an upper end of the side surface frame.

3. The electronic component of claim 2, wherein the external electrode comprises a head portion disposed on a side surface of the body in the first direction; and
   a band portion extending from the head portion onto portions of other surfaces of the body, respectively.

4. The electronic component of claim 2, wherein the surface unevenness portion is disposed on at least a region of a lower surface of the upper surface frame.

5. The electronic component of claim 4, wherein the surface unevenness portion is further disposed on at least a region of an upper surface of the upper surface frame.

6. The electronic component of claim 3, further comprising a conductive adhesive layer between an upper surface of the band portion and the upper surface frame.

7. The electronic component of claim 6, wherein the surface unevenness portion is disposed adjacent to the conductive adhesive layer.

8. The electronic component of claim 6, wherein the surface unevenness portion is disposed on the upper surface frame in a region between the conductive adhesive layer and the side surface frame.

9. The electronic component of claim 1, wherein the surface unevenness portion has at least one linear groove.

10. The electronic component of claim 1, wherein the surface unevenness portion has repeated unevennesses having a sawtooth shape.

11. The electronic component of claim 1, wherein the surface unevenness portion includes a pyramid shape repeatedly disposed on the portion of the interface, the pyramid shape having a central protruding portion.

12. The electronic component of claim 2, wherein the capacitor component is disposed below the upper surface frame, and
the electronic component further comprises another capacitor component disposed above the upper surface frame.

13. The electronic component of claim 12, further comprising:
a first conductive adhesive layer disposed between the external electrode of the capacitor component and the upper surface frame; and
a second conductive adhesive layer disposed between an external electrode of the another capacitor component and the upper surface frame.

14. The electronic component of claim 1, wherein the encapsulant includes an insulating resin.

15. The electronic component of claim 1, wherein h is 0.1*t or less, in which h is a maximum depth of unevennesses included in the surface unevenness portion, and t is a thickness of the metal frame.

16. An electronic component, comprising:
a capacitor component including a body and an external electrode disposed on the body;
an encapsulant encapsulating at least a portion of the capacitor component; and
a metal frame including a first portion embedded in the encapsulant and connected to the external electrode, and a second portion extending from the first portion and disposed outside the encapsulant,
wherein a degree of surface roughness of a portion of the first portion in contact with the encapsulant is greater than a degree of surface roughness of a portion of the second portion spaced apart from the encapsulant.

17. The electronic component of claim 16, wherein the portion of the first portion having the degree of surface roughness greater than the portion of the second portion faces the external electrode.

18. The electronic component of claim 16, further comprising a conductive adhesive layer connecting the first portion and the external electrode to each other, and
wherein the portion of the first portion having the degree of surface roughness greater than the portion of the second portion is disposed between the second portion and the conducive adhesive layer.

19. The electronic component of claim 16, further comprises another capacitor component having at least a portion embedded in the encapsulant,
wherein the first portion is disposed between the capacitor component and the another capacitor component.

20. The electronic component of claim 16, wherein the portion of the first portion having the degree of surface roughness greater than the portion of the second portion comprises protrusion portions and recessed portions alternatively disposed.

21. The electronic component of claim 16, wherein the second portion includes a side surface frame disposed to face a side surface of the capacitor component, and a lower surface frame extending from a lower end of the side surface frame to face a lower surface of the capacitor component, and
the first portion is included in an upper surface frame of the metal frame, the upper surface frame facing an upper surface of the capacitor component.

* * * * *